United States Patent
Grant et al.

(10) Patent No.: US 8,451,785 B2
(45) Date of Patent: May 28, 2013

(54) CONTROL SIGNAL AGGREGATION IN A MULTI-CARRIER WCDMA SYSTEM

(75) Inventors: Stephen Grant, Pleasanton, CA (US); Anders Wallén, Ystad (SE); Yi-Pin Eric Wang, Fremont, CA (US)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 604 days.

(21) Appl. No.: 12/614,526

(22) Filed: Nov. 9, 2009

(65) Prior Publication Data

US 2011/0110337 A1    May 12, 2011

(51) Int. Cl.
*H04W 4/00*  (2009.01)
*H04B 7/216*  (2006.01)

(52) U.S. Cl.
USPC .............................. 370/329; 370/335; 370/338

(58) Field of Classification Search
USPC .......................................... 370/329, 335, 338
See application file for complete search history.

(56) References Cited

U.S. PATENT DOCUMENTS

| | | | |
|---|---|---|---|
| 2002/0126689 A1* | 9/2002 | Redington | 370/442 |
| 2009/0028103 A1 | 1/2009 | Wang et al. | |
| 2009/0213805 A1* | 8/2009 | Zhang et al. | 370/329 |
| 2010/0227569 A1* | 9/2010 | Bala et al. | 455/73 |
| 2010/0232373 A1* | 9/2010 | Nory et al. | 370/329 |
| 2010/0323744 A1* | 12/2010 | Kim et al. | 455/522 |

FOREIGN PATENT DOCUMENTS

EP    1 895 697 A1    3/2008

OTHER PUBLICATIONS

3rd Generation Partnership Project, "Physical channels and mapping of transport channels onto physical channels (FDD)," 3GPP TS 25.211, version 8.2.0 Release 8, Oct. 2008.
3rd Generation Partnership Project, "Multiplexing and channel coding (FDD)," 3GPP TS 25.212, version 8.3.0 Release 8, Oct. 2008.

* cited by examiner

*Primary Examiner* — Brandon Renner

(57) ABSTRACT

Methods and apparatus are disclosed for transmitting data to a remote node via each of two or more transmitted carrier signals, wherein a distinct outbound packet data traffic channel is mapped to each transmitted carrier signal. In an exemplary method, aggregated control channel data is formed by combining control channel data corresponding to each of two or more received carrier signals, simultaneously transmitting traffic channel data to the remote node on each of the two or more outbound packet data traffic channels, and transmitting the aggregated control channel data using one or more physical control channels mapped to a first one of the transmitted carrier signals. In particular, these methods and apparatus may be applied to a multi-carrier High-Speed Packet Access (HSPA) system.

10 Claims, 9 Drawing Sheets

CONTROL SIGNAL AGGREGATION IN A MULTI-CARRIER WCDMA SYSTEM

TECHNICAL FIELD

The present invention relates generally to wireless communications systems, and more particularly to techniques for efficiently transmitting control channel information in a multi-carrier high-speed wireless data system.

BACKGROUND

Multi-carrier (MC) High-Speed Packet-Access (HSPA) is currently being standardized by the 3rd-Generation Partnership Project (3GPP). In the 3GPP's so-called Release 8 specifications, downlink packet communication using two adjacent HSPA carriers is supported. In the uplink, for the time being, only single-carrier transmissions are possible, but there is a 3GPP work item aiming at including communication using two adjacent uplink HSPA carriers in Release 9. In the work item, the carriers are intended to operate as legacy carriers to as large an extent as possible. Future 3GPP releases can be expected to evolve MC-HSPA in several ways, including support for more than two carriers and operation in different frequency bands. Furthermore, it may be desired to evolve the standard to further optimize the performance of a multi-carrier system.

As wireless networks continue to evolve to carry more packet data, while carrying less circuit switched data, it is quite likely that that one or more supplementary carriers in an MC-HSPA system will carry packet data exclusively. Consequently, it makes sense to optimize these carriers for packet data-only transmission. Today, however, the 3GPP standards for Wideband Code-Division Multiple Access (WCDMA) are sub-optimal for packet data-only transmission, particularly with respect to the uplink. Specifically, although the 3GPP specifications today (Release 7) support data rates of up to 11.52 megabits-per-second (Mbps) in the uplink, realizing such a high rate is challenging in practice. In fact, even a data rate of 4 Mbps is considered challenging today. A fundamental issue is that the power received at the base station (or "Node B", in 3GPP terminology) needs to be at a very high level when a high data rate is used. However, a high received power level from a data user generally results in significant interference and degraded performance for important control channels that support the data service. To combat this increased interference and alleviate degraded control channel performance, user terminals may try to increase their transmit power levels. However, such actions may give rise to an unstable system, as the system's rise-over-thermal (RoT) metric can become out of control.

SUMMARY

In various embodiments of the present invention, control channel data from two or more downlink carriers in a multi-carrier HSPA system are remapped (i.e., aggregated) onto a single downlink anchor carrier, or control channel data from multiple uplink carriers are remapped onto a single uplink anchor carrier, or both. In many cases, this aggregation allows for the configuration of one or more "clean" carriers in either or both of the uplink and downlink.

More generally, disclosed herein are various methods and apparatus for transmitting data to a remote node via each of two or more transmitted carrier signals, wherein a distinct outbound packet data traffic channel is mapped to each transmitted carrier signal. In an exemplary method, aggregated control channel data is formed by combining control channel data corresponding to each of two or more received carrier signals, simultaneously transmitting traffic channel data to the remote node on each of the two or more outbound packet data traffic channels, and transmitting the aggregated control channel data using one or more physical control channels mapped to a first one of the transmitted carrier signals.

In some embodiments, the aggregated control channel data comprises one or more control channel data types selected from the group consisting of: power control commands corresponding to each of the two or more received carrier signals; absolute grant data corresponding to each of the two or more received carrier signals, the absolute grant data indicating a maximum data rate for transmission on the inbound packet data traffic channel for the corresponding received carrier signal; relative grant data corresponding to each of the two or more received carrier signals, the relative grant data indicating a change in data rate for transmission on the inbound packet data traffic channel for the corresponding received carrier signal; acknowledgement data, negative acknowledgement data, or both, corresponding to packet data received on the inbound packet data traffic channels for each of the two or more received carrier signals; and channel quality data corresponding to each of the two or more received carrier signals.

In some embodiments, forming aggregated control channel data further comprises combining additional control channel data with the control channel data for the received carrier signals, this additional control channel data corresponding to the two or more transmitted carrier signals. In some of these embodiments, this additional control channel data comprises one or more control channel data types selected from the group consisting of: transmit buffer status data corresponding to the outbound packet data traffic channels for each of the two or more transmitted carrier signals; automatic repeat request process data corresponding to the outbound packet data traffic channels for each of the two or more transmitted carrier signals; and transport format data corresponding to the outbound packet data traffic channels for each of the two or more transmitted carrier signals. In some embodiments, one of the methods described above may further comprise transmitting a pilot channel via each of the transmitted carrier signals.

In some embodiments, the methods described above may further include time-multiplexing the outbound packet data traffic channel for one of the transmitted carrier signals with control channel data for the transmitted carrier signal, to form an outbound combined physical channel, and spreading the outbound combined physical channel with a spreading code to form an outbound spread spectrum signal. In these embodiments, simultaneously transmitting traffic channel data to the remote node on each of the two or more outbound packet data traffic channels comprises transmitting the outbound spread spectrum signal via the transmitted carrier signal. In some of these embodiments, the time-multiplexed control channel data comprises one or more control channel data types selected from the group consisting of: transmit buffer status data corresponding to the outbound packet data traffic channels for the transmitted carrier signals; automatic repeat request process data corresponding to the outbound packet data traffic channel for the transmitted carrier signals; and transport format data corresponding to the outbound packet data traffic channels for the transmitted carrier signals.

In some embodiments, transmitting the aggregated control channel data using one or more physical control channels mapped to a first one of the transmitted carrier signals comprises time-division multiplexing control channel data for the received carrier signals by mapping bits of this control channel data to time slots of the first one of the transmitted carrier signals according to a pre-determined mapping pattern that associates one or more time slots to control data for each of the first and second received carrier signals.

In several of the above-summarized embodiments, combining the control channel data for the two or more received carrier signals comprises time-division multiplexing control channel data for first and second ones of the received carrier signals using first and second subframes of a first one of the transmitted carrier signals. In others, combining the control channel data comprises masking a first error-detecting code generated from control channel data for a first one of the received carrier signals with a first radio identifier corresponding to the remote node, masking a second error-detecting code generated from control channel data for a second one of the received carrier signals with a second radio identifier corresponding to the remote node and differing from the first radio identifier, and including the masked first and second error-detecting codes among the aggregated control channel data. In some of these latter embodiments, combining the control channel data comprises code-division multiplexing the control channel data for the first and second ones of the received carrier signals using first and second channelization codes, respectively.

In still other embodiments, combining the control channel data for the two or more received carrier signals comprises encoding first control channel data with a first signature sequence previously assigned to the remote node; encoding second control channel data with a second signature sequence, differing from the first signature sequence and also previously assigned to the remote node; and including the encoded first control channel data and the encoded second control channel data among the aggregated control channel data. In some of these embodiments, transmitting the aggregated control channel data using one or more physical control channels mapped to a first one of the transmitted carrier signals comprises code-division multiplexing the encoded first control channel data and the encoded second control channel data using first and second channelization codes. In others, transmitting the aggregated control channel data using one or more physical control channels mapped to a first one of the transmitted carrier signals comprises time-division multiplexing the encoded first control channel data and the encoded second control channel data using first and second subframes of the first one of the transmitted carrier signals.

Any of the methods described above, and variants thereof, may be implemented in a wireless transceiver for use at either or both ends of a wireless link, such as at a Node B or mobile station (commonly referred to as user equipment, or "UE", in 3GPP documentation) in a multi-carrier HSPA system. Thus, embodiments of the invention include a wireless transceiver comprising a transmitter circuit configured to transmit data to a remote node via two or more distinct outbound packet data channels mapped to corresponding transmitted carrier signals, a receiver circuit configured to receive first and second distinct inbound packet data traffic channels mapped respectively to first and second received carrier signals, and a control circuit configured to carry out one or more of the above-described techniques. In particular, the control circuit may be configured to form aggregated control channel data by combining first control channel data corresponding to the first received carrier signal with second control channel data corresponding to the second received carrier signal; simultaneously transmit traffic channel data to the remote node on each of the two or more outbound packet data traffic channels, via the transmitter circuit; and transmit the aggregated control channel data using one or more physical control channels mapped to a first one of the transmitted carrier signals, using the transmitter circuit.

The present invention may, of course, be carried out in other ways than those specifically set forth herein without departing from essential characteristics of the invention. Upon reading the following description and viewing the attached drawings, the skilled practitioner will recognize that the described embodiments are illustrative and not restrictive, and that all changes coming within the meaning and equivalency range of the appended claims are intended to be embraced therein

DETAILED DESCRIPTION

Figure 1:
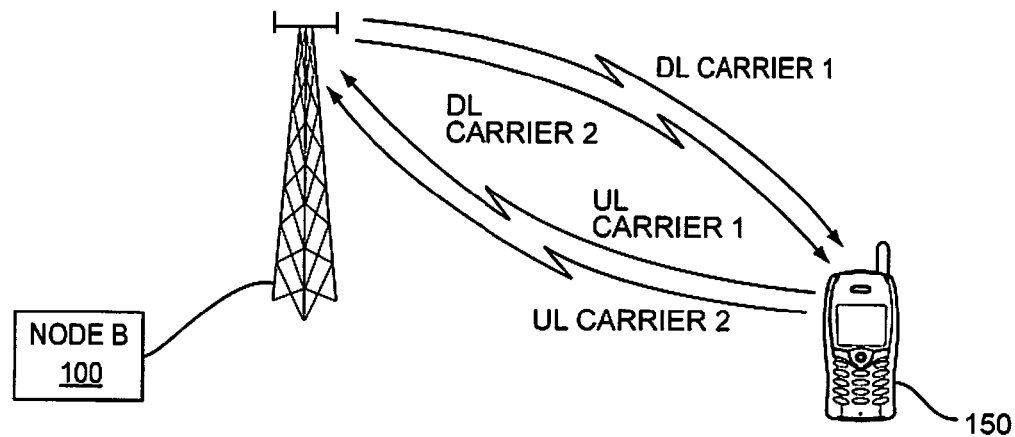
FIG. 1 illustrates an exemplary wireless communication system utilizing multi-carrier transmission.

Various aspects of the present invention are described below in the context of the multi-carrier HSPA specifications currently being developed by the 3GPP. Of course, those skilled in the art will appreciate that the techniques described herein are not limited to application in these particular systems, and may be applied to other wireless systems, whether already developed or yet to be planned.

As discussed above, achieving very high packet data rates in a wireless link generally requires that the power level of the high-speed data channel, as received at the remote node, needs to be very high. However, control channel data is conventionally transmitted on the same carrier as the high-speed data channel, but on one or more separate, low-rate, physical channels (e.g., separated by channelization codes). The high power levels required for the high-speed data channels can cause significant interference to these important control channels. As noted, one possible response to this problem is simply to raise the overall transmitted power levels, but this approach can lead to unstable system performance, as well as worse coverage, since UEs may not be able to increase their transmit power enough to compensate for the increased interference level.

In a multi-carrier system, where each carrier includes at least one separate and distinct high-speed data channel, and where each high-speed data channel has corresponding control channel data, another approach is to take advantage of the fact that there are multiple carriers by separating different types of traffic. For example, low-rate, delay-sensitive transmissions, such as control channels, can be aggregated onto a specific carrier, called the anchor carrier. To protect these control channels from excess interference, very-high-data-rate transmissions may not be allowed on this carrier. Instead, high-rate, best-effort packet data communications may be restricted to one or more supplementary (non-anchor) carriers, which may tolerate much higher rise-over-thermal (RoT) levels, and which may possibly even tolerate short-term system instability. In this way, one or more of the supplementary carriers are configured to be "clean," in the sense that they are not cluttered with control channels that suffer when high-data-rate transmissions occur.

In a co-pending U.S. patent application titled "Management of Uplink Resources in Multi-Carrier CDMA System," by Y. P. E. Wang, et al., Ser. No. 12/537,148 (hereinafter the "Wang application"), a control signaling method to facilitate a separation of low-rate and high-rate traffic across uplink carriers is disclosed. The entire contents of the Wang application are incorporated herein by reference. In particular, the Wang application discloses a method in which the mobile station provides an indication of its transmit buffer status to the system scheduler in the Node B. When the scheduler knows the mobile station's buffer status, it can make better decisions regarding which carrier to use for scheduling the mobile station's uplink data transmissions, based on whether the mobile station has a lot of data left to transmit or only a small amount. However, the techniques disclosed in the Wang application are generally suited for the case of mobile stations that are configured to utilize only one uplink carrier at a time, but that can switch between multiple uplink carriers paired with multiple downlink carriers. The Wang application is not directed to methods of aggregating control channel traffic from multiple carriers onto a single anchor carrier, which is the focus of the present discussion.

In a multi-carrier system according to some embodiments of the present invention, control channels from two or more downlink carriers are remapped onto a single downlink anchor carrier. Likewise, in some embodiments, control channels from two or more uplink carriers are aggregated on an uplink anchor carrier. This aggregation approach allows for the configuration of "clean" carriers in both the uplink and downlink, i.e., carriers carrying only high-speed packet data or carrying only a limited quantity of control channel data in addition to high-speed packet data.

To provide context for the detailed discussion that follows, FIG. 1 is a simplified diagram of a multi-carrier wireless system according to some embodiments of the present invention. The system illustrated in FIG. 1 includes a Node B 100 and a mobile station 150. Node B 100 is transmitting data to mobile station 150 on two carriers, DL Carrier 1 and DL Carrier 2, and is receiving data from mobile station 150 on each of two carriers, UL Carrier 1 and UL Carrier 2. As will be described in further detail below, mobile station 150 may be configured to combine control data that would normally be carried on UL Carrier 2 with the control channel data normally associated with DL Carrier 1, and transmitted on UL Carrier 1. This approach may leave UL Carrier 2 "clean," i.e., carrying only a high-speed packet data channel or carrying only a very limited quantity of control channel data along with a high-speed packet data channel. A similar approach may be taken by Node B 100 with regards to DL Carrier 1 and DL Carrier 2.

Figure 2:
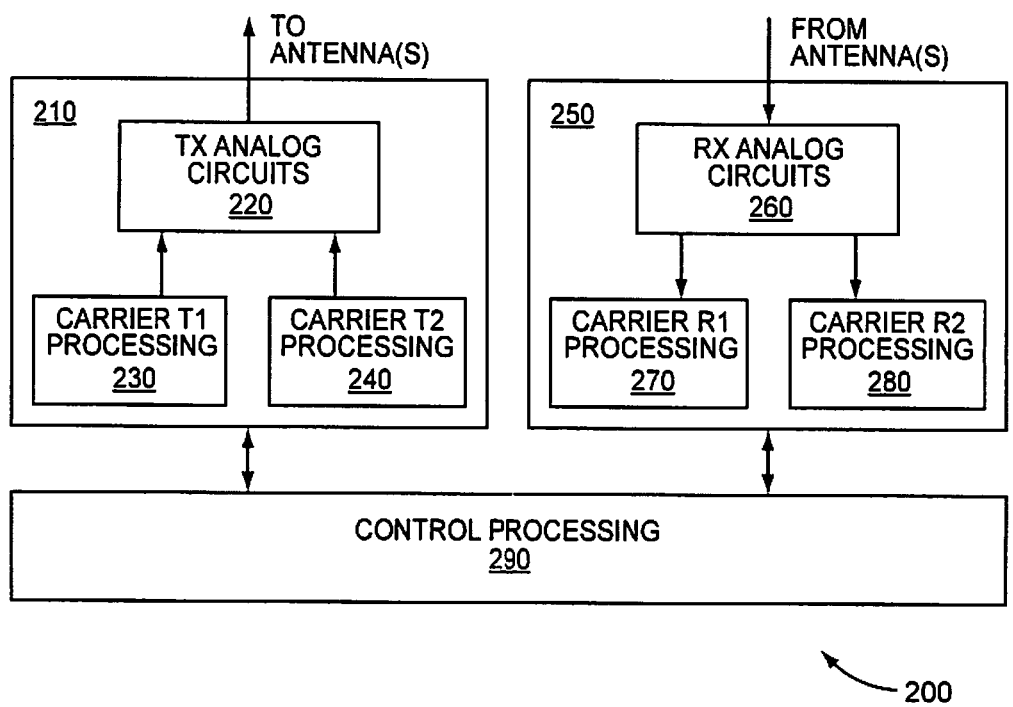
FIG. 2 is a block diagram illustrating functional components of a wireless transceiver according to some embodiments of the invention.

FIG. 2 is a schematic diagram illustrating functional elements of a transceiver system 200 according to some embodiments of the invention. Although generally described herein with respect to a mobile station, such as mobile station 150 in FIG. 1, those skilled in the art will appreciate that a base station, such as Node B 100, will include similar, although perhaps somewhat more complicated, circuitry.

In any case, the transceiver system 200 pictured in FIG. 2 includes a transmitter section 210, receive section 250, and control processing section 290. Transmitter section 210 includes transmitter (TX) analog circuits 220, and two carrier processing circuits for producing modulated carriers for transmission, denoted Carrier T1 Processing circuit 230 and Carrier T2 Processing circuit 240, respectively. Similarly, receiver section 250 includes receiver (RX) analog circuits 260, and two carrier processing circuits for de-modulating and decoding received carriers, denoted Carrier R1 processing circuit 270 and Carrier R2 processing circuit 280.

Transmitter circuit 210 and receiver circuit 250 are controlled by control processing circuit 290, which is configured, among other things, to implement one or more protocol stacks in compliance with one or more wireless communications standards, such as the 3GPP HSPA specifications. In particular, control processing circuit 290 may include a digital processing circuit, such as the exemplary processing circuit 300 illustrated in FIG. 3.

Figure 3:
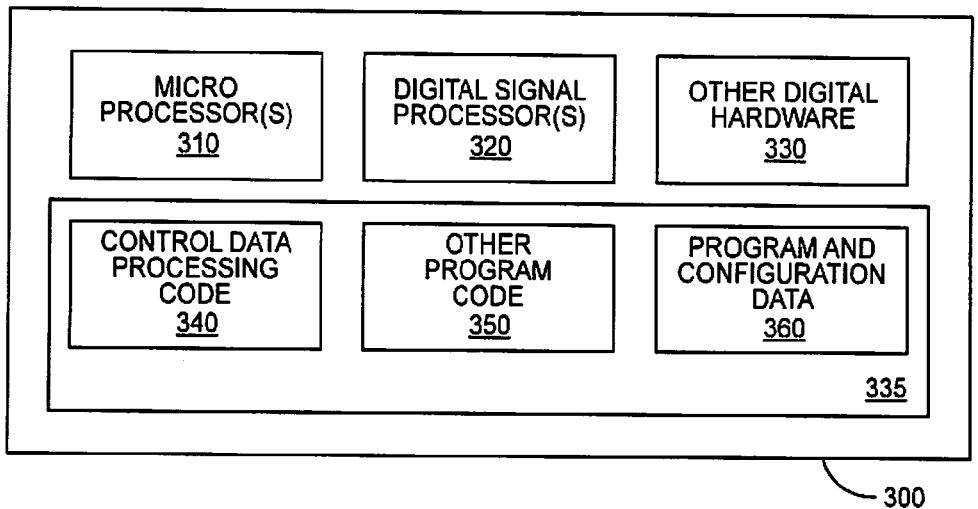
FIG. 3 is a block diagram illustrating an exemplary processing circuit.

Although those skilled in the art will appreciate that the specific configuration of processing circuits used in Node B 100 or mobile station 150 may vary, an exemplary processing circuit 300, as pictured in FIG. 3, includes one or several microprocessors 310, digital signal processors 320, and the like, as well as custom digital hardware 330, any or all of which may be configured with appropriate software and/or firmware to carry out one or more communications protocols such as well as the specific multi-carrier control data aggregation techniques described herein. Those skilled in the art will also appreciate that one or more of microprocessors 310, digital signal processors 320, as well as the other digital hardware 330, may be included in a single application-specific integrated circuit (ASIC), or several processors 310 or 320 and/or various digital hardware 330 may be distributed among several separate components, whether individually packaged or assembled into a system-on-a-chip (SoC).

In any case, processing circuit 300 further includes memory 335 (which may also be implemented, in full or in part, on a single ASIC, along with the processors 310 and 320 and other hardware 330, or with separate components), configured with program code for execution by processors 310 and 320. In particular, memory 335 (which may include various types such as Flash, read-only memory (ROM), optical storage, magnetic storage, etc.) includes control data processing code 340, which includes program instructions for use by processors 310 and/or 320 in carrying out one or more of the techniques described herein for aggregating control channel data in a multi-carrier data transmission. Memory 335 further includes other program code 350, and program and configuration data 360. Those skilled in the art will appreciate that conventional hardware and software design techniques may be applied to implement the various inventive methods disclosed herein using a processing circuit similar to that pictured in FIG. 3.

Figure 4:
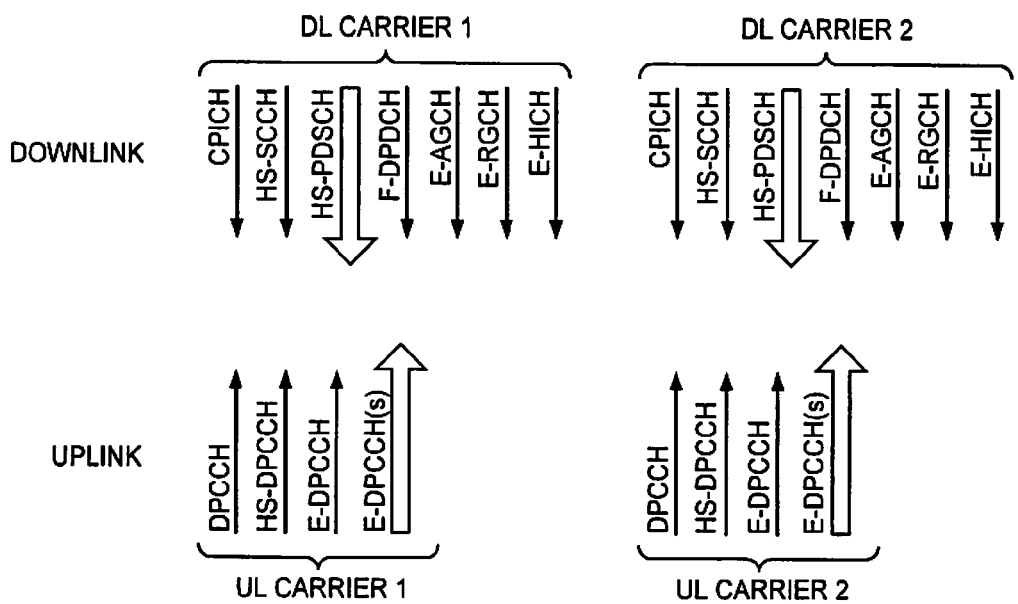
FIG. 4 illustrates the mapping of data channels and control channels to carriers in an HSPA system.

FIG. 4 illustrates a conventional mapping of physical channels to HSPA carriers. This basic mapping is the starting point for the aggregation of control channels onto an anchor carrier, in an HSPA system. While FIG. 4 shows the case of two downlink and two uplink carriers, i.e., a symmetric scenario, in general the number of downlink and uplink carriers allocated to a given user does not have to be the same (asymmetric scenario). Furthermore, the control channel aggregation techniques disclosed herein are not restricted to use with systems using only two carriers; those skilled in the art recognize that these techniques may readily be adapted for use with three or more carriers.

A very brief description of the various channels depicted in FIG. 4 follows. On the downlink, the High-Speed Physical Downlink Shared Channel (HS-PDSCH) carries downlink packet data addressed to one or more mobile stations, while the High-Speed Shared Control Channel (HS-SCCH) carries control information related to the HS-PDSCH such as the modulation format, the channelization codes that are used, HARQ information, etc. The Fractional Dedicated Physical Channel (F-DPCH) carries power control commands used to control mobile stations' uplink transmit powers; it is shared in the sense that multiple users' power control commands are multiplexed onto this one channel. The E-DCH Absolute Grant Channel (E-AGCH) carries an absolute grant informing a particular mobile station of what maximum data rate it can transmit in the uplink, while the E-DCH Relative Grant Channel (E-RGCH) carries a relative grant informing a particular user if he should increase/decrease/or hold the currently granted rate. Finally, the E-DCH HARQ Indicator Channel (E-HICH) carries ACK/NACKs to inform a particular mobile station whether a transport block was successfully received or not by the Node B, while the Common Pilot Channel (CPICH) carries pilot symbols broadcast to all users.

On the uplink, the E-DCH Dedicated Physical Data Channel (E-DPDCH) carries uplink packet data, while the E-DCH Physical Control Channel (E-DPCCH) carries control information related to the uplink E-DPDCH such as HARQ information, transport format, and buffer status (e.g., a "happy" bit). The High-Speed Dedicated Physical Control Channel (HS-DPCCH) carries ACK/NACKs to inform the Node B whether a particular transport block was successfully received or not at the mobile station, as well as Channel Quality Indicator (CQI) reports to inform the Node B of the channel quality observed by the mobile station, for use by the Node B in scheduling and link adaptation in the downlink. Finally, the Dedicated Physical Control Channel (DPCCH) carries at least pilot symbols and power control commands for controlling power levels of dedicated channels in the downlink.

In some embodiments of the present invention, the F-DPCH, E-AGCH, E-RGCH, and E-HICH from multiple downlink carriers are aggregated onto a single downlink anchor carrier. In some of these embodiments, then, the downlink carriers are constructed as shown in FIG. 5, where the group of control channel signals denoted as 510 are aggregated, in that the corresponding control channel data for both the anchor carrier (DL Carrier 1) and the supplementary carrier (DL Carrier 2) are combined and transmitted on the anchor carrier, DL Carrier 1.

Figure 5:
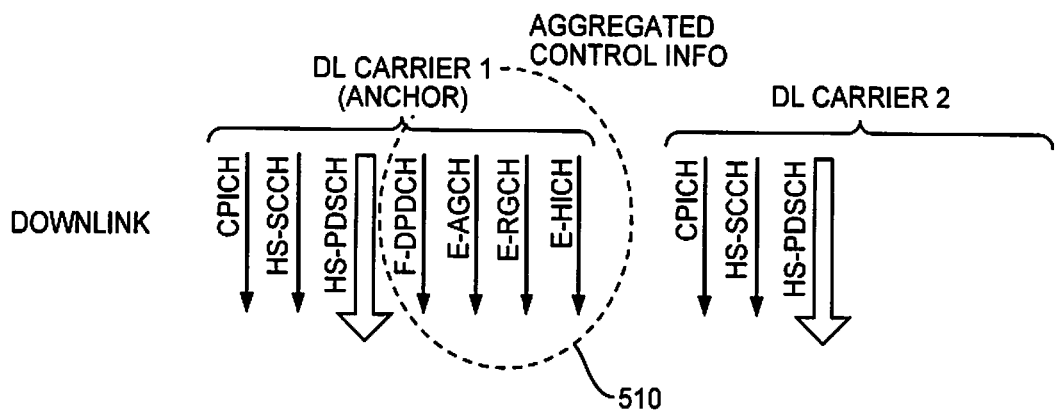
FIG. 5 illustrates the aggregation of control channel data on a downlink anchor carrier in a multi-carrier system.

In the particular configuration illustrated in FIG. 5, two remaining control channels (CPICH and HS-SCCH) remain on the supplementary carrier (DL Carrier 2), along with the supplementary carrier's high-speed packet data channel (HS-PDSCH). This control information is tightly coupled to the downlink packet data channel—the CPICH channel, for instance, provides the mobile station with important information for estimating propagation channel conditions. Thus, it may be undesirable or unfeasible to move this data to the anchor channel. However, DL Carrier 2 may still be transmitted as a completely "clean carrier" (i.e., with no code-multiplexed control channels) by transmitting this control information in-band, i.e., by time-multiplexing this control data with the high-speed packet data on HS-PDSCH, using the same spreading code. This would effectively leave only the downlink packet data channel on the supplementary carrier. Those skilled in the art will appreciate that various techniques for time-multiplexing one or more control channels with the high-speed packet data channel are possible.

For the uplink, in some embodiments of the present invention, a portion of the control information from the DPCCH (power control commands) on two or more uplink carriers is aggregated onto a single uplink anchor carrier. In addition, HS-DPCCH control information from the two (or more) uplink carriers may be aggregated. (Aggregation of HS-DPCCH information for two carriers is currently covered by the 3GPP Release 8 standards.) After aggregation, the uplink carriers in these embodiments are configured as shown in FIG. 6, where the HS-DPCCH and all but the pilots of the DPCCH for the supplementary uplink carrier (UL Carrier 2) are combined with the corresponding data for the anchor carrier (UL Carrier 1), and transmitted on the anchor carrier, as shown at 610.

Figure 6:
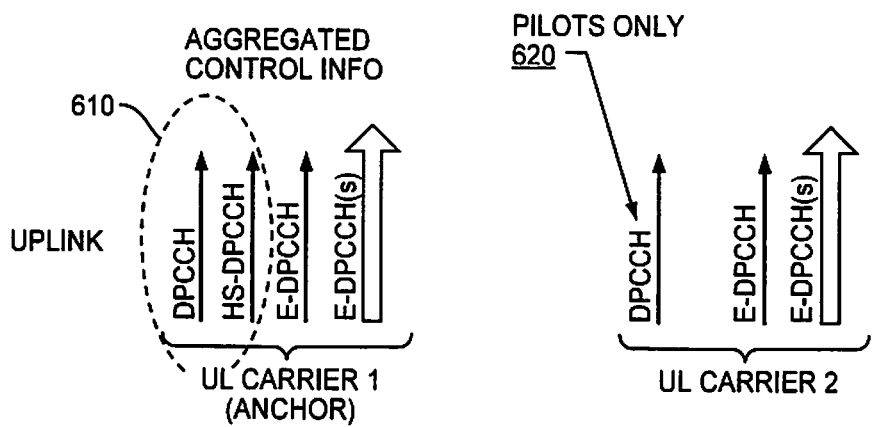
FIG. 6 illustrates the aggregation of control channel data on an uplink anchor carrier in a multi-carrier system.

As with the downlink configuration illustrated in FIG. 5, FIG. 6 shows two remaining control channels on the supplementary carrier, namely the E-DPCCH and the pilots 620 from DPCCH (UL Carrier 2). Again, this control information is tightly coupled to the uplink packet data channel (E-DPDCH). Once more, to truly configure UL Carrier 2 as a completely clean carrier (no code-multiplexed control channels), this control information could be transmitted in-band (i.e., time multiplexed on the same spreading code). This would effectively leave only the uplink packet data channel on the supplementary carrier. Again, various techniques may be used to provide this in-band signaling of control information.

Following is a detailed description of several techniques for aggregating control information from multiple carriers onto a single anchor carrier. These techniques are applied to specific HSPA channels in both the downlink and uplink. However, those skilled in the art will recognize that several of these techniques may be adapted to different control channels than those discussed below. Furthermore, these techniques are not limited in their application to multi-carrier HSPA systems, but may be applied to other multi-carrier systems as well.

Referring once more to FIG. 5, control information to be aggregated on the downlink anchor carrier is carried by the E-AGCH, E-RGCH, E-HICH, and F-DPCH. These are treated separately in the following discussion.

Figure 7:
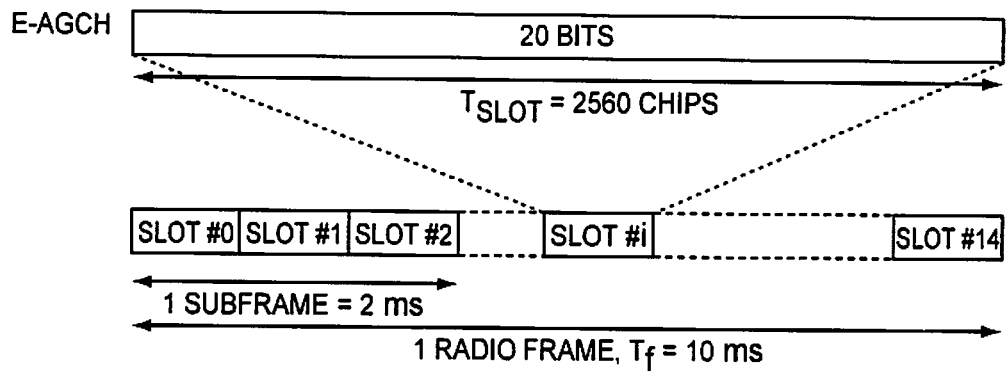
FIG. 7 illustrates the frame structure of the HSPA E-AGCH channel.

The E-DCH Absolute Grant Channel (E-AGCH) is a fixed rate (thirty kilobits-per-second, with a spreading factor of 256) downlink physical channel with a frame structure as shown in FIG. 7. An absolute grant message (i.e., the E-AGCH control information) consists of sixty coded bits per 2-millisecond subframe—these sixty bits are targeted to a particular mobile station. The absolute grant informs the mobile station of what maximum data rate (in terms of a power offset relative to the DPCCH) it is allowed to transmit. As shown in 3rd Generation Partnership Project, "Multiplexing and channel coding (FDD)," 3GPP TS 25.212, version 8.3.0 Release 8, September 2008, the sixty coded bits are generated according to the overall coding chain shown in FIG. 8.

Figure 8:
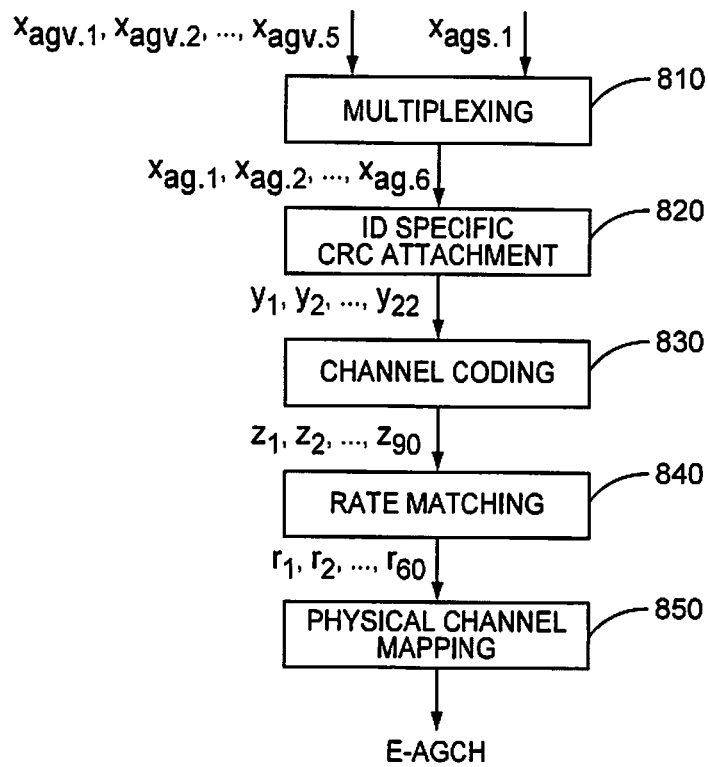
FIG. 8 illustrates the coding chain for the HSPA E-AGCH channel.

As shown in FIG. 8, a 6-bit absolute grant message is formed by multiplexing five absolute grant value bits ($x_{agv.1}$-$x_{agv.5}$) with a single absolute grant scope bit ($x_{ags.1}$), as shown at block 810. A particular mobile station is addressed by attaching a 16-bit UE-specific cyclic redundancy check (CRC) sequence to the 6-bit absolute grant message ($x_{ag.1}$-$x_{ag.6}$), as shown at block 820, before coding, rate matching, and physical channel mapping, which are shown at blocks 830, 840, and 850, respectively. The UE-specific CRC sequence is generated by masking a CRC sequence generated from the 6-bit grant message with a UE-specific identifier (ID) sequence, called the E-RNTI (E-DCH Radio Network Temporary Identifier), which is assigned to the mobile station by the network.

All mobile stations listen to the same E-AGCH channel and attempt to decode it. However, only the mobile station having the ID that matches the one used to generate the UE-specific CRC will be able to successfully decode the grant message. At all other mobile stations, the CRC check will fail. In this way, the absolute grant message is made available solely to the intended UE.

In some embodiments of the invention, all E-AGCH control signaling from multiple downlink carriers is aggregated onto the anchor carrier. The same total number (or fewer) E-AGCHs may be maintained, i.e., a distinct absolute grant message for each carrier may still be transmitted. The absolute grant messages for each carrier may be distinguished by assigning mobile station identifier sequences (E-RNTIs) that are both user-specific and carrier-specific. The assignment is done in such a way that there is a common understanding between the network and the mobile station regarding to which carrier each E-RNTI corresponds. Thus, a mobile station can attempt to decode each E-AGCH message using two (or more) CRC sequences, corresponding to the received CRC bits "de-masked" with each of its two or more E-RNTIs. In this way, whenever one of these CRC successfully checks out at the intended mobile station, the mobile station knows to which carrier the absolute grant message corresponds.

In one example, if it is assumed that the network wishes to send an absolute grant message to a particular mobile station for two carriers, and if it is further assumed that the two assigned ID sequences are E-RNTI$_1$, corresponding to carrier 1, and E-RNTI$_2$, corresponding to carrier 2, then the network can send the two absolute grant messages to the same mobile station using two different E-AGCH channelization codes in the same subframe simultaneously, using code-division multiplexing. In this example, E-RNTI$_1$ is used on the first E-AGCH channelization code and E-RNTI$_2$ is used on the second E-AGCH channelization code. Alternatively, the network could signal the two absolute grant messages to the same mobile station on the same E-AGCH channelization code, but during different subframes, i.e., using time division multiplexing. With this alternative approach E-RNTI$_1$ is used during the first subframe, and E-RNTI$_2$ is used during the second subframe. Those skilled in the art will appreciate that with the code-division multiplexing aggregation scheme, it is possible to use only one E-RNTI sequence for each user as long as there is a common "understanding" between the network and the mobile station (i.e., a pre-determined relationship, whether statically or dynamically configured) about which E-AGCH channelization code corresponds to which carrier.

Another alternative to the code-division multiplexing or time-division multiplexing aggregation schemes discussed above is an approach in which only a single E-RNTI and single E-AGCH channelization code are used, but the E-AGCH message bits (e.g., the input values in FIG. 7) from two or more carriers are aggregated into a single message. In some embodiments, this combined message may include the same number of total bits (e.g., six) used for a single-carrier HSPA implementation. In others, an increased number of total bits (e.g., more than six) is used. In either case, this latter approach generally requires the design of a new absolute grant table (i.e., compared to the table defined in 3GPP TS 25.212, v. 8.3.0) that maps the signaled index to a power offset (ultimately a transmit rate). In some embodiments in particular, the signaled index could indicate whether a grant is given for just a single carrier or multiple carriers, depending on the absolute position of the index within the table.

Figure 9:
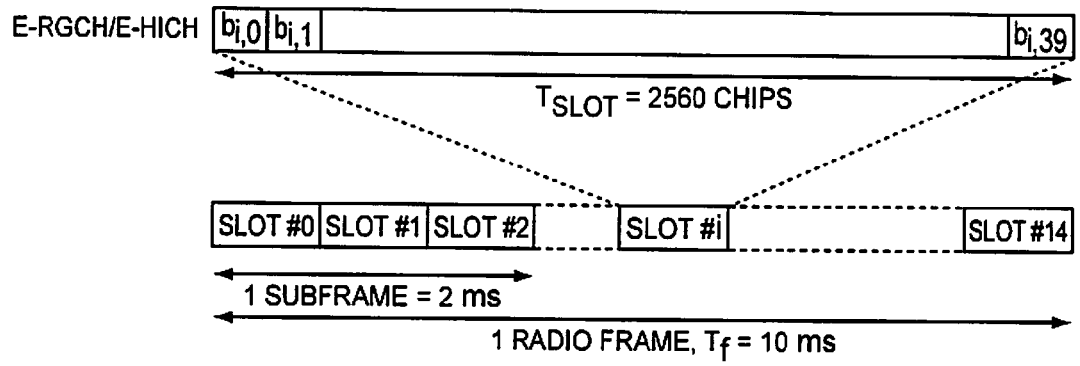
FIG. 9 illustrates the frame structure of HSPA E-RGCH/E-HICH channels.

The E-DCH Relative Grant Channel (E-RGCH) is a fixed rate (spreading factor of 128) downlink physical channel with a frame structure as illustrated in FIG. 9. The relative grant message (i.e., the control information carried by the E-RGCH) consists of a length-120 sequence of ternary values per 2 ms subframe; each such sequence is targeted to a particular mobile station. The relative grant informs the mobile station whether to increase, hold, or decrease its data rate, e.g., by indicating the need for a step change in power offset relative to the DPCCH. As shown in detail in 3rd Generation Partnership Project, "Physical channels and mapping of transport channels onto physical channels (FDD)," 3GPP TS 25.211, version 8.2.0 Release 8, October 2008, a particular mobile station is addressed by the network assigning different length-120 signature sequences to different mobile stations. Forty different signatures are defined by the standard, meaning that one E-RGCH channel is capable of addressing forty different users. If there are more than forty users in a cell, then additional channelization codes are used to define additional E-RGCH channels, each capable of addressing an additional forty users.

The l-th length-120 signature sequence is defined as:

$$s_l = [c_i c_j c_k],$$

where the sequences $c_i$, $c_j$, and $c_k$ are drawn from a set of forty different length-40 base sequences, all with values of ±1. The base set is designed to have low cross-correlations between sequences. For each user (each l), different values of i, j, k are assigned. For example, for the first user, values of i=0, j=2, k=13 might be assigned, for the second user, values of i=1, j=18, k=18 might be assigned, and so on.

The actual sequence transmitted on the E-RGCH for the lth user is given by as$_l$ where a is the relative grant message itself. The relative grant message can take on three possible values, +1, −1, or 0 depending on whether the control message is increase, hold, or decrease the currently granted rate.

Up to forty different mobile stations listen to the same E-RGCH channel and attempt to receive a signaled E-RGCH message by correlating the received signal with the mobile station's assigned signature sequence $s_l$. Only the mobile station having the signature sequence that matches the one used to generate the E-RGCH message will detect a large (positive or negative) correlation value. If a large positive value is obtained, the mobile station increases its rate. If a large negative value is obtained, the mobile station decreases its rate. If a small correlation value is obtained, the mobile station knows that either it is not addressed, or is addressed but the relative grant message is "hold." In either case, the mobile station holds its currently granted rate. In this way, the relative grant message is made available solely to the intended mobile station.

In some embodiments of the current invention, all E-RGCH control signaling from multiple downlink carriers is aggregated onto the anchor carrier. In some of these embodiments, the same total number of E-RGCHs is maintained; in others fewer distinct E-RGCHs are maintained. In either case, however, the assignment of length-120 signature sequences may be both mobile station-specific and carrier-specific. The assignment is done in such a way that there is a common understanding (i.e., a pre-determined relationship, whether statically or dynamically configured) between the network and the mobile station regarding to which carrier each signature sequence corresponds.

For example, if it is assumed that the network wishes to send a relative grant message to a particular mobile station for two carriers, and if it is assumed that the two assigned signature sequences for this mobile station are $s_0$, corresponding to (uplink) carrier 1, and $s_1$ corresponding to (uplink) carrier 2, then the network could then signal two relative grant messages to the same mobile stations using two different E-RGCH channelization codes in the same subframe simultaneously, e.g., using code division multiplexing. In this example, signature sequence $s_0$ is used on the first E-RGCH channelization code, while signature sequence $s_1$ is used on the second E-RGCH channelization code. Alternatively, the network could signal the two relative grant messages to the same UE on the same E-RGCH channelization code but during different subframes, i.e., using time division multiplexing. With this alternative approach, signature sequence $s_0$ would be used during the first subframe, and signature sequence $s_1$ would be used during the second subframe. Note that for the CDM aggregation scheme, it is possible to use only one signature sequence $s_1$ for each user, provided that there is a common understanding between the network and the mobile station about which E-RGCH channelization code corresponds to which carrier.

The E-DCH Hybrid Indicator Channel (E-HICH) is a fixed rate (spreading factor of 128) downlink physical channel with exactly the same frame structure as for the E-RGCH (see FIG. 9). The ACK/NACK message (i.e., the E-HICH control information) consists of a length-120 sequence of ternary values per 2 ms subframe, targeted to a particular mobile station. The ACK/NACK informs the mobile station of whether or not the corresponding data previously transmitted by the mobile station was correctly received or not by the base station.

The signature sequences and control message for the E-HICH are generated and detected in the exactly the same way as for the E-RGCH. The only difference is the way in which the control message is interpreted by the addressed mobile station. A value of +1 indicates that the data is correctly received; while a value of −1 indicates that an error occurred, thus requiring a retransmission. A value of 0 (zero) is used only by non-serving cells as a form of "no indication" (in contrast to an ACK). In order for a mobile station to distinguish between an E-RGCH or E-HICH control message, either a different channelization code (or codes) is used for each of the two control channels, or the same channelization code is used but with different subsets of the set of forty signature sequences designating the E-HICH and E-RGCH.

In some embodiments of the current invention, the same method described above for the E-RGCH is used for aggregating the E-HICH control signaling from multiple downlink carriers onto the anchor carrier. Namely, signature sequence assignment is made to be both mobile station-specific as well as carrier-specific. Furthermore, either a code-division multiplexing or time-division multiplexing approach is used to aggregate the control information from multiple carriers, as described above.

Figure 10:
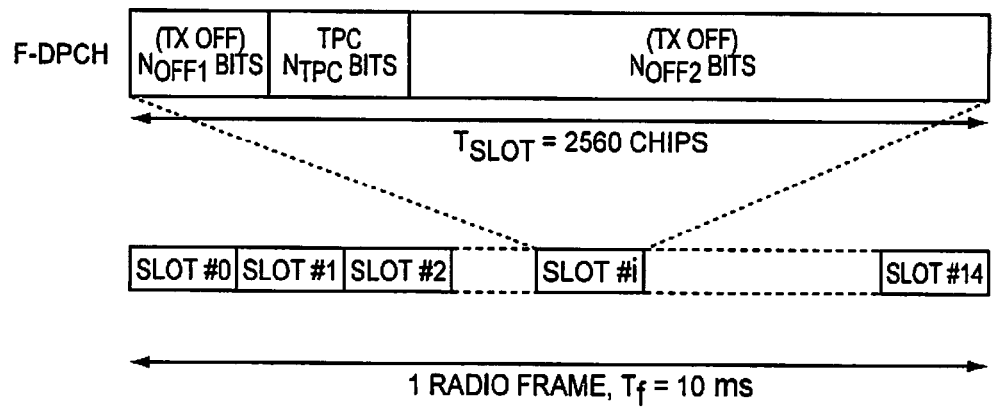
FIG. 10 illustrates the slot structure of the HSPA F-DPCH channel.

The Fractional-Dedicated Physical Channel (F-DPCH) is a fixed rate (spreading factor of 256) downlink physical channel with a slot structure as illustrated in FIG. 10. The control information carried on the F-DPCH consists of transmit power control (TPC) commands for up to ten different users. The total number of bits per slot is twenty, and each user's TPC command is two bits long. The location of a particular two-bit TPC command within the slot is determined by defining a corresponding number of $N_{OFF1}$ and $N_{OFF2}$ bits, as shown in FIG. 10. By assigning different values of $N_{OFF1}$ and $N_{OFF2}$ for each user, effectively ten subslots per slot are created. In this way, the TPC commands for ten different users may be time-multiplexed onto the same F-DPCH. If there are more than this many users in a cell, then additional channelization codes are used to define additional F-DPCH channels, each capable of addressing ten additional users.

In some embodiments of the current invention, all F-DPCH control signaling from multiple downlink carriers is aggregated onto the anchor carrier. The same total number (or fewer) F-DPCHs are maintained; however, the assignment of subslots in each F-DPCH slot is both mobile station-specific and carrier-specific. The assignment is done in such a way that there is a common understanding (i.e., a predetermined relationship, whether statically or dynamically configured) between the network and the mobile station regarding to which carrier each subslot corresponds.

For example, if it is assumed that the network wishes to send a TPC message to a particular mobile station for two carriers, and if it is further assumed that the two assigned subslots for this mobile station are subslot-0, corresponding to carrier 1, and subslot-1, corresponding to carrier 2, then the network in some embodiment signals a TPC message for each carrier to the same mobile station, using the two assigned subslots in the same slot, i.e., using time-division multiplexing. Alternatively, subslot-0 on two different F-DPCHs could be assigned to the same mobile station, in which case the network may be configured to signal the two TPC messages simultaneously, but using two different channelization codes, i.e., using code-division multiplexing. With this code-division multiplexing approach, there needs to be a common understanding between the network and the mobile station about which F-DPDCH channelization code corresponds to which carrier; again, this pre-determined relationship may be statically or dynamically configured, in various embodiments.

On the uplink side, the control information to be aggregated on the uplink anchor carrier, in some embodiments, is the control information carried by the DPCCH and HS-DPCCH. (See FIG. 6.) The details of aggregation of HS-DPCCH control information are not described in detail herein, since at least one aggregation technique is addressed in the current Release 8 3GPP standards. Indeed, during standardization discussions, several particular aggregation methods have been proposed; thus several reasonable methods are already known to those skilled in the art. For this reason, the following discussion focuses only on the aggregation of the DPCCH control information.

The DPCCH carries at least two pieces of control information: dedicated pilot symbols, used by the base station to estimate propagation channel conditions, and transmit power control (TPC) commands for power controlling various downlink signals. In fact, for the packet data-only scenario, i.e., situations in which only E-DPDCH is transmitted, with no legacy dedicated physical data channels (DPDCHs), then the DPCCH carries only pilots and TPC commands. (This is strictly true provided that closed-loop transmit diversity is disabled, thus removing the necessity for the feedback information bits used to set the transmit weights.) Since the pilots must generally remain on the same carrier to support demodulation of the E-DPDCH on each carrier, they cannot be aggregated onto the anchor carrier. However, the TPC bits can.

Figure 11:
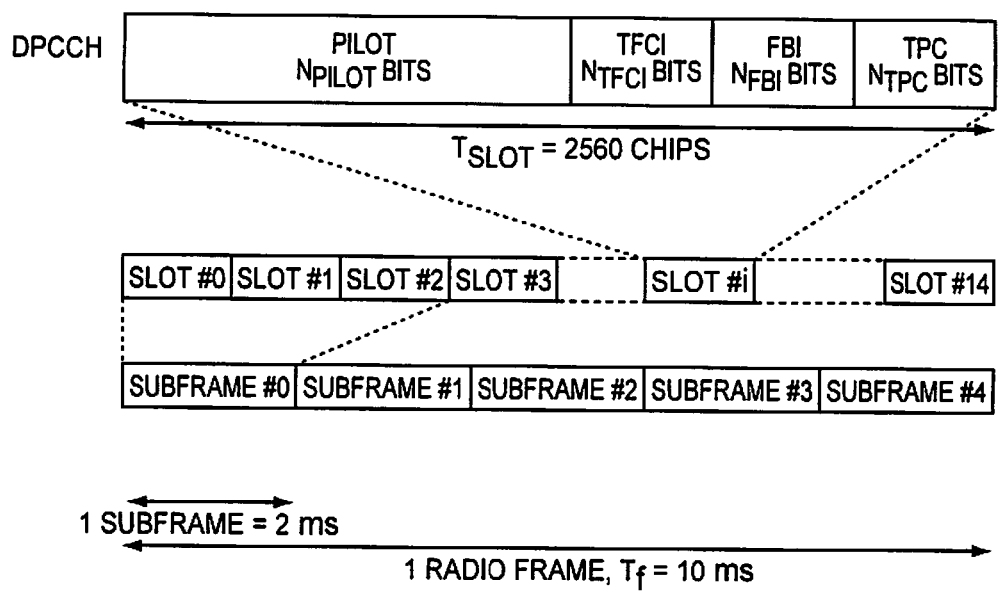
FIG. 11 illustrates the slot structure of the uplink DPCCH in an HSPA system.

FIG. 11 shows the structure of the uplink DPCCH. Assuming the number of feedback information (FBI) bits is zero ($N_{FBI}=0$) and the number of transport format combination indicator (TFCI) bits ($N_{TFCI}=0$), since no DPDCH is configured, then two DPCCH slot formats are available: (1) Slot Format #4 with six pilots bits ($N_{pilot}=6$) and four TPC bits ($N_{TPC}=4$), and (2) Slot Format #1 with eight pilot bits ($N_{pilot}=8$) and four TPC bits ($N_{TPC}=2$).

In some embodiments of the current invention, all TPC commands from the DPCCHs on two or more downlink carriers are aggregated onto the anchor carrier. For the case of two uplink carriers this could easily be achieved by using DPCCH Slot Format #4, with four TPC bits. In this case, the first two bits could be used to signal the TPC command for carrier 1 and the last two bits for carrier 2.

Similarly, for the case of four carriers, the four TPC bits could be used to signal TPC commands with only one bit used per carrier. However, this would require increasing the DPCCH power to ensure reliable TPC detection. Alternatively, two DPCCH channels could be configured and transmitted using two different channelization codes, giving access to eight TPC bits. With this approach, the first DPCCH could be used to signal TPC commands for the first two carriers, e.g., using two bits per carrier, and the second DPCCH used to signal TPC commands for the third and fourth carriers. Optionally, the pilot bits on the second DPCCH could be turned off to save power. With this latter approach, in which two DPCCH channels are separated only by a channelization code, there needs to be a common understanding between the network and the mobile station about which DPCCH channelization code corresponds to which carrier or carriers.

Those skilled in the art will appreciate that the detailed techniques discussed above for aggregating control information corresponding to multiple carriers of a multi-carrier system onto a single anchor carrier may allow one or more supplementary carriers to be optimized for packet data-only transmission. In other words, as discussed above, a "clean" carrier may be configured, facilitating the actual realization of higher data rates than might otherwise be possible. More generally speaking, the resulting clean carriers are an enabler for implementing advanced data-oriented features that offer a combination of performance improvement, flexibility, and/or efficiency. Correspondingly, the aggregation of control information onto anchor carrier protects control channels from excessive interference caused by co-channel high-data-rate packet data channels, potentially resulting in improved reliability for the control channel data.

Figure 12:
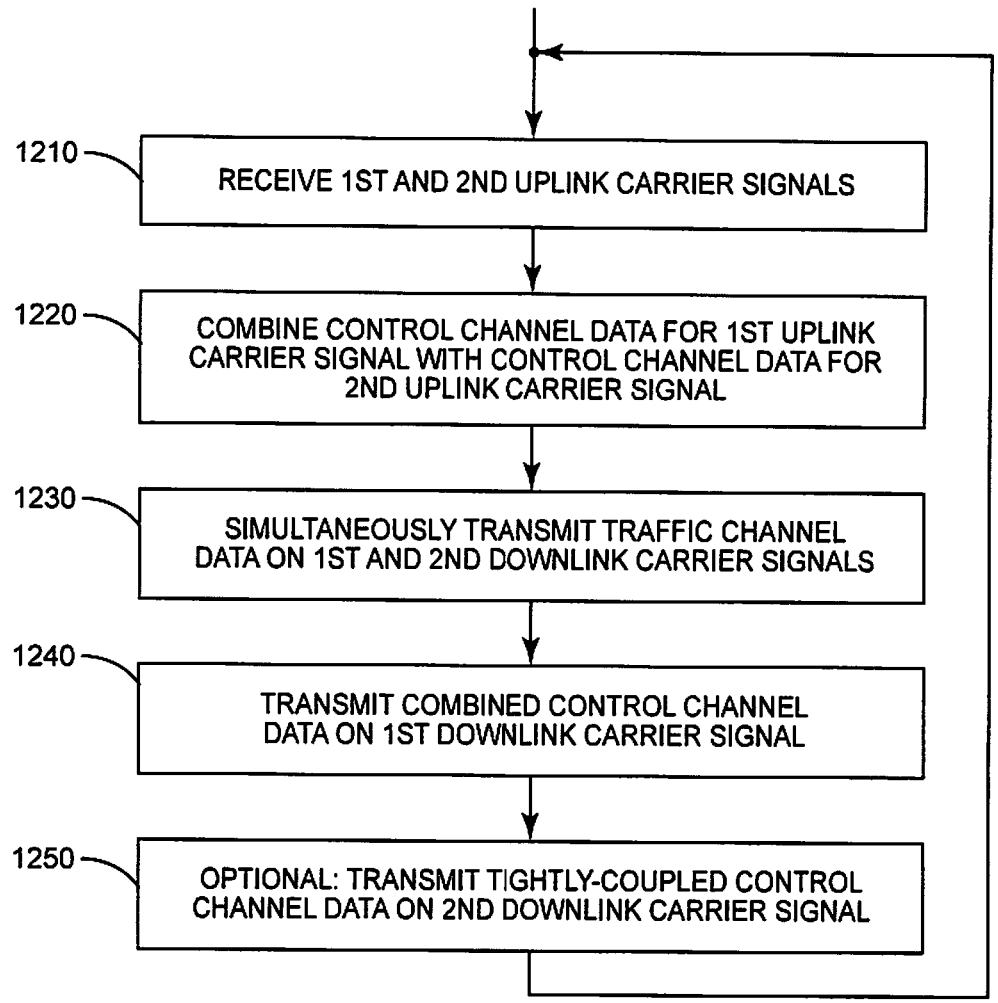
FIG. 12 is a process flow diagram illustrating an exemplary method for transmitting aggregated control channel data in a multi-carrier system.

Although several specific aggregation techniques were described above in the context of an HSPA system, and often specifically in the context of a two-carrier HSPA system, those skilled in the art will also appreciate that these techniques may be more generally applied to multi-carrier systems, with two or more aggregated carriers on either the uplink, the downlink, or both. Accordingly, the process flow diagram of FIG. 12 illustrates a generalized method for transmitting data to a remote node via each of two or more transmitted carriers, in a scenario where a distinct outbound packet data traffic channel is mapped to each transmitted carrier signal and a distinct inbound packet data traffic channel is mapped to each of at least first and second received carrier signals. The particular method illustrated in FIG. 12 is suitable for implementation at a base station node; however, an essentially identical method may be implemented at a mobile station, by simply reversing the references to "uplink" and "downlink" carriers.

The illustrated method begins, as shown at block 1210, with the receiving of first and second uplink carrier signals, each carrying a distinct inbound packet data traffic channel. As shown at block 1220, control channel data corresponding to the first uplink carrier signal is combined with similar control channel data corresponding to the second received carrier signal. Although traffic channel data is simultaneously transmitted on each of the first and second downlink carrier signals (e.g., via a distinct HS-PDSCH for each carrier), as shown at block 1230, the combined control channel data is transmitted only on the first downlink carrier signal (which may be considered the "anchor" carrier for the downlink), as shown at block 1240.

In some embodiments, no distinct physical control channels are transmitted on the second (supplementary) carrier signal. In these embodiments, the second carrier signal is completely "clean", facilitating the use of very-high data rates on the packet data channel carried by the second carrier signal, without concerns of interference to control channels on the same carrier. (A completely clean carrier can only be achieved by in-band signaling of the tightly coupled control channel data, as described below. This control information always has to be signaled in one form or another to support high speed packet data.) In other embodiments, however, one or more types of control channel data may be closely coupled to the downlink packet data channel on each carrier, so that it is advantageous to transmit this tightly coupled control channel data on the second downlink carrier signal, as shown at block 1250. In this scenario, the second downlink carrier signal is only partly "cleaned." However, as was discussed earlier, various techniques for moving this tightly-coupled control channel "inband," i.e., time-multiplexing the control channel data with the high-speed packet data, may be used, to eliminate entirely the need for code-separated physical control channels on the supplementary carrier.

The types of control channel data that may be combined on a transmitted anchor carrier include, but are not limited to, any of the following: power control commands corresponding to each of at least first and second received carrier signals; absolute grant data corresponding to each of at least the first and second received carrier signals, the absolute grant data indicating a maximum data rate for transmission on the inbound packet data traffic channel for the corresponding received carrier signal; relative grant data corresponding to each of at least the first and second received carrier signals, the relative grant data indicating a change in data rate for transmission on the inbound packet data traffic corresponding to the corresponding received carrier signal; acknowledgement data (ACKs), negative acknowledgement data (NACKs), or both, corresponding to packet data received on each of at least first and second received carrier signals; and channel quality data corresponding to each of at least first and second received carrier signals.

Those skilled in the art will appreciate that the process flow of FIG. 12 illustrates a control channel aggregation technique in which control channel data corresponding to first and second received (i.e., inbound) carrier signals are aggregated for transmission on a transmitted (i.e., outbound) carrier signal. Control channel data corresponding to each of two or more transmitted (outbound) carrier signals may also be aggregated and transmitted on a single transmitted carrier signal. Thus, for example, transport format information defining the modulation and/or coding schemes used for packet data channels on each of two transmitted carriers may be combined and transmitted on a single anchor carrier, along with, for example, HARQ feedback (i.e., ACKs and/or NACKs) corresponding to two received carrier signals. Other examples of control channel data corresponding to outbound packet data channels on each of the two or more transmitted carrier signals include, but are not limited to transmit buffer status data corresponding to the outbound packet data traffic channels for each of the two or more transmitted carrier signals, and automatic repeat request process data (e.g., process identifiers) corresponding to the outbound packet data traffic channels for each of the outbound packet data traffic channels. Any or all of these may be aggregated and transmitted on a single anchor carrier, in various embodiments of the present invention.

As discussed above, it may be advantageous in some cases to leave certain control data, especially pilot symbols, on the same carrier as the packet data channel to which the control data corresponds, even while other control data from two or more carriers is aggregated for transmission on a single carrier. In some embodiments, this remaining control data may be time-multiplexed with an outbound packet data traffic channel, on at least one of the carrier signals, to form an outbound combined physical channel comprising both traffic data and control data. This combined physical channel can then be spread with a spreading code to form an outbound spread spectrum signal, and transmitted on the carrier. In this manner, a completely "clean" carrier can be formed, in which only a single code-spread signal is transmitted.

Figure 13:
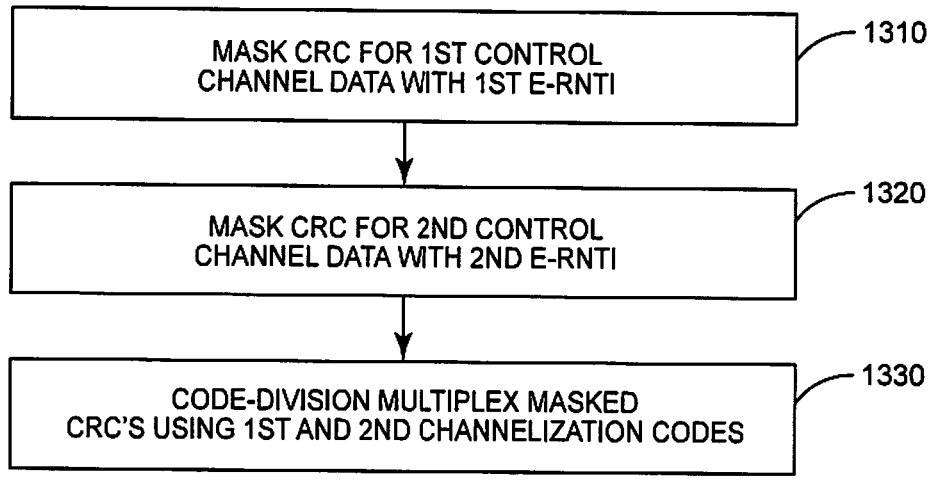
FIG. 13 is a process flow diagram illustrating a method for combining control channel data according to some embodiments of the invention.
Figure 14:
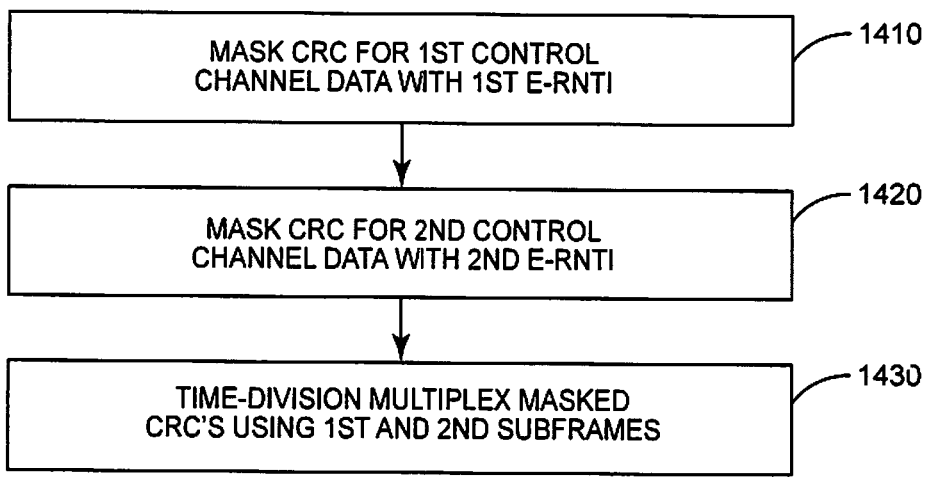
FIG. 14 is a process flow diagram illustrating another exemplary method for combining control channel data.

Two specific methods for combining control data from two carriers to form aggregated control channel data are illustrated in FIGS. 13 and 14. Of course, these methods are illustrative only; those skilled in the art will appreciate that variants of these are also possible.

In the method illustrated in the process flow of FIG. 13, the control channel data from each of two carrier signals includes or is processed to form an error-detecting code, such as cyclic redundancy check (CRC) data. The CRC for control channel data for a first carrier is masked with a first identifier (e.g., an E-RNTI), as shown at block 1310. Similarly, the CRC for control channel data for a second carrier is masked with a second identifier (e.g., an E-RNTI), as shown at block 1320. Next, as shown at block 1330, the first and second masked CRC's are code-division multiplexed, using first and second channelization codes, respectively, to form distinct physical channels for transmission on single anchor carrier.

With the scheme illustrated in FIG. 13, the receiving node (e.g., a mobile station, in the event of a downlink transmission) can distinguish which control channel data corresponds to each of the first and second carriers by means of the first or second identifiers, which are known by the receiving node to correspond to first and second carrier signals according to a pre-determined relationship. (This relationship may be statically defined, in which case the relationship may be "hard-coded" in the receiving node, or may be dynamically configured, e.g., by means of configuration data broadcast by a serving base station to a mobile station.) Alternatively, a receiving node may determine which control channel data corresponds to which carrier by means of the first and second channelization codes, which in some embodiments may be known to the receiving node to correspond to the first and second carriers. (Again, this pre-determined relationship may be statically or dynamically configured.) Indeed, in a variant of the method pictured in FIG. 13, only a single E-RNTI is used to mask both of the first and second CRC's, as the receiving node is able to match the received control channel data to the proper carrier by means of the channelization codes used to spread the data.

Another technique for aggregating control channel data is illustrated in the process flow of FIG. 14. As with the method illustrated in FIG. 13, an error-detecting code (e.g., CRC data) for each of the first and second control channel data, corresponding to first and second carrier signals, respectively, is masked with first and second identifiers (e.g., E-RNTI's assigned to a mobile station), respectively. This is illustrated in FIG. 14 at blocks 1410 and 1420. As shown at block 1430, the masked error-detecting code (as well as the corresponding control channel data itself) is time-division multiplexed. This time-division multiplexed data may then be spread with a channelization code for transmission on an anchor carrier. The receiving node, in this case, is able to determine which control channel data corresponds to which carrier signal by detecting that a particular CRC data string has been masked with an identifier corresponding to the receiving node and known by the receiving node to correspond to a particular carrier. Thus, for example, a mobile station may have been assigned a specific E-RNTI for each of two carrier signals; detecting that a particular control channel data segment has been masked with that E-RNTI then directly indicates the corresponding anchor channel. Alternatively, in some embodiments, the receiving node may be configured to determine which carrier signal corresponds to a particular control channel data element by virtue of the data's position in the time-division multiplexed sequence. In these embodiments, a single identifier may be used to mask error-detecting codes for control channel data for both carriers, as distinct identifiers are not needed to distinguish the data.

Figure 15:
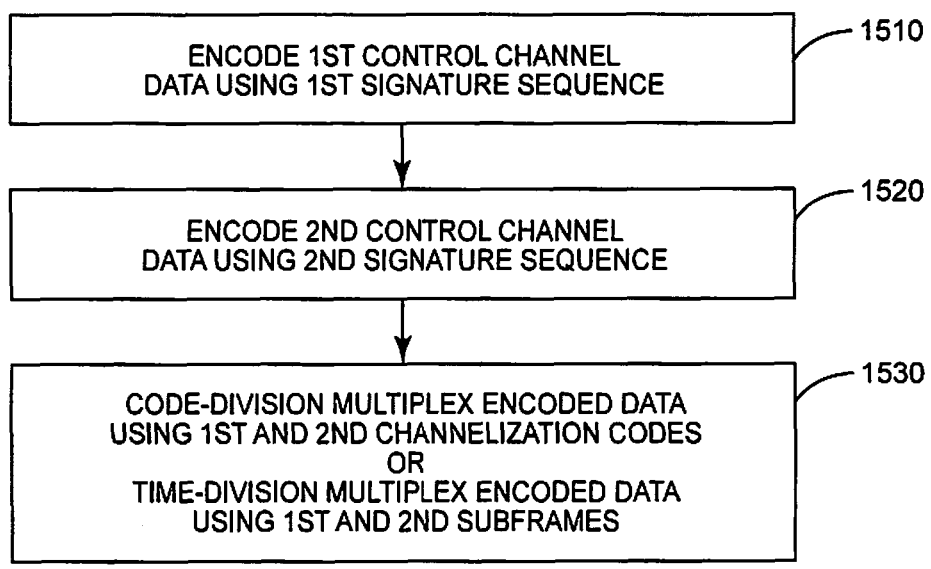
FIG. 15 is a process flow diagram illustrating still another exemplary method for combining control channel data.

Another technique for aggregating control channel data for transmission on an anchor carrier is shown in FIG. 15. The illustrated process flow depicts a technique that is generalized somewhat from the specific technique described above with respect to aggregating E-RGCH data in an HSPA system. The illustrated process begins, as shown at block 1510, with encoding first control channel data corresponding to a first carrier signal (e.g., such as E-RGCH data for the first carrier) with a first signature sequence (such as the 120-bit signature sequence described earlier). As shown at block 1520, second control channel data, corresponding to a second carrier signal, is encoded with a second signature sequence. The first and second control channel data, which are distinguishable by a receiving node by virtue of their distinct signature sequences, may then be aggregated and transmitted on a single carrier signal, using one or more physical control channels mapped to the carrier signal. As shown at block 1530, this may comprise code-division multiplexing the encoded first control channel data and the encoded second control channel data using first and second channelization codes, respectively. Alternatively, this may instead comprise time-division multiplexing the encoded first control channel data and the encoded second control channel data using first and second subframes of the anchor carrier signal. Those skilled in the art will appreciate that variants and combinations of these schemes are also possible.

The techniques illustrated in the process flow diagrams of FIGS. 12 to 15 may be implemented at either or both ends of any of a variety of wireless links. As described in some detail above, these techniques may be implemented at a Node B and/or at a mobile station configured for operation in a network supporting 3GPP HSPA operation. Thus, embodiments of the present invention include methods according to the techniques illustrated and more generally described above, as well as wireless transceivers configured to carry out one or more of these techniques, whether for use in a base station or a mobile station. However, those skilled in the art will recognize that the present invention may be carried out in other ways than those specifically set forth herein without departing from essential characteristics of the invention. The present embodiments are thus to be considered in all respects as illustrative and not restrictive, and all changes coming within the meaning and equivalency range of the appended claims are intended to be embraced therein.

What is claimed is:

1. A method in a wireless transceiver for transmitting data to a remote node via each of two or more transmitted carrier signals, wherein a distinct outbound packet data traffic channel is mapped to each transmitted carrier signal, the method comprising:
    forming aggregated control channel data by combining first control channel data corresponding to a first received carrier signal with second control channel data corresponding to a second received carrier signal, wherein a distinct inbound packet data traffic channel is mapped to each of the first and second received carrier signals;
    time-multiplexing the outbound packet data traffic channel for a second one of the transmitted carrier signals with third control channel data to form an outbound combined physical channel; and
    spreading the outbound combined physical channel with a spreading code to form an outbound spread spectrum signal;
    simultaneously transmitting traffic channel data to the remote node on each of the two or more outbound packet data traffic channels further comprising transmitting the outbound spread spectrum signal via the second one of the transmitted carrier signals; and
    transmitting the aggregated control channel data using one or more physical control channels mapped to a first one of the transmitted carrier signals;
    wherein the first and second control channel data comprise one or more control channel data types selected from the group consisting of:
        power control commands corresponding to each of the first and second received carrier signals;
        acknowledgement data, negative acknowledgement data, or both, corresponding to packet data received on the inbound packet data traffic channels for each of the first and second received carrier signals; and
        channel quality data corresponding to each of the first and second received carrier signals.

2. The method of claim 1, wherein the third control channel data comprises one or more control channel data types selected from the group consisting of:
    transmit buffer status data corresponding to the outbound packet data traffic channels for the second one of the transmitted carrier signals;
    automatic repeat request process data corresponding to the outbound packet data traffic channel for the second one of the transmitted carrier signals; and
    transport format data corresponding to the outbound packet data traffic channels for the second one of the transmitted carrier signals.

3. A method in a wireless transceiver for transmitting data to a remote node via each of two or more transmitted carrier signals, wherein a distinct outbound packet data traffic channel is mapped to each transmitted carrier signal, the method comprising:
    forming aggregated control channel data by combining first control channel data corresponding to a first received carrier signal with second control channel data corresponding to a second received carrier signal, wherein a distinct inbound packet data traffic channel is mapped to each of the first and second received carrier signals and further comprising
        encoding the first control channel data with a first signature sequence previously assigned to the remote node;
        encoding the second control channel data with a second signature sequence, differing from the first signature sequence and also previously assigned to the remote node; and
        including the encoded first control channel data and the encoded second control channel data among the aggregated control channel data;
    simultaneously transmitting traffic channel data to the remote node on each of the two or more outbound packet data traffic channels; and
    transmitting the aggregated control channel data using one or more physical control channels mapped to a first one of the transmitted carrier signals;
    wherein the first and second control channel data comprise one or more control channel data types selected from the group consisting of:
        power control commands corresponding to each of the first and second received carrier signals;
        acknowledgement data, negative acknowledgement data, or both, corresponding to packet data received on the inbound packet data traffic channels for each of the first and second received carrier signals; and
        channel quality data corresponding to each of the first and second received carrier signals.

4. The method of claim 3, wherein transmitting the aggregated control channel data using one or more physical control channels mapped to the first one of the transmitted carrier signals comprises code-division multiplexing the encoded first control channel data and the encoded second control channel data using first and second channelization codes.

5. The method of claim 3, wherein transmitting the aggregated control channel data using one or more physical control channels mapped to the first one of the transmitted carrier signals comprises time-division multiplexing the encoded first control channel data and the encoded second control channel data using first and second subframes of the first one of the transmitted carrier signals.

6. A wireless transceiver comprising a transmitter circuit configured to transmit data to a remote node via two or more distinct outbound packet data channels mapped to corresponding transmitted carrier signals, a receiver circuit configured to receive first and second distinct inbound packet data traffic channels mapped respectively to first and second received carrier signals, and a control circuit configured to:
    form aggregated control channel data by combining first control channel data corresponding to the first received carrier signal with second control channel data corresponding to the second received carrier signal;
    time-multiplex the outbound packet data traffic channel for a second one of the transmitted carrier signals with third control channel data to form an outbound combined physical channel;
    spread the outbound combined physical channel with a spreading code to form an outbound spread spectrum signal; and
    transmit traffic channel data to the remote node on each of the two or more outbound packet data traffic channels by transmitting the outbound spread spectrum signal via the second one of the transmitted carrier signals, via the transmitter circuit; and transmit the aggregated control channel data using one or more physical control channels mapped to a first one of the transmitted carrier signals, using the transmitter circuit;

wherein the first and second control channel data comprise one or more control channel data types selected from the group consisting of:
  power control commands corresponding to each of the first and second received carrier signals;
  acknowledgement data, negative acknowledgement data, or both, corresponding to packet data received on the inbound packet data traffic channels for each of the first and second received carrier signals; and
  channel quality data corresponding to each of the first and second received carrier signals.

7. The wireless transceiver of claim 6, wherein the third control channel data comprises one or more control channel data types selected from the group consisting of:
  transmit buffer status data corresponding to the outbound packet data traffic channels for the second one of the transmitted carrier signals;
  automatic repeat request process data corresponding to the outbound packet data traffic channel for the second one of the transmitted carrier signals; and
  transport format data corresponding to the outbound packet data traffic channels for the second one of the transmitted carrier signals.

8. A wireless transceiver comprising a transmitter circuit configured to transmit data to a remote node via two or more distinct outbound packet data channels mapped to corresponding transmitted carrier signals, a receiver circuit configured to receive first and second distinct inbound packet data traffic channels mapped respectively to first and second received carrier signals, and a control circuit configured to:
  form aggregated control channel data by combining first control channel data corresponding to the first received carrier signal with second control channel data corresponding to the second received carrier signal;
  combine the first control channel data with the second control channel data by:
    encoding the first control channel data with a first signature sequence previously assigned to the remote node;
    encoding the second control channel data with a second signature sequence, differing from the first signature sequence and also previously assigned to the remote node; and
    including the encoded first control channel data and the encoded second control channel data among the aggregated control channel data;
  simultaneously transmit traffic channel data to the remote node on each of the two or more outbound packet data traffic channels, via the transmitter circuit; and
  transmit the aggregated control channel data using one or more physical control channels mapped to a first one of the transmitted carrier signals, using the transmitter circuit;

wherein the first and second control channel data comprise one or more control channel data types selected from the group consisting of:
  power control commands corresponding to each of the first and second received carrier signals;
  acknowledgement data, negative acknowledgement data, or both, corresponding to packet data received on the inbound packet data traffic channels for each of the first and second received carrier signals; and
  channel quality data corresponding to each of the first and second received carrier signals.

9. The wireless transceiver of claim 8, wherein the control circuit is configured to transmit the aggregated control channel data using one or more physical control channels mapped to the first one of the transmitted carrier signals by code-division multiplexing the encoded first control channel data and the encoded second control channel data using first and second channelization codes.

10. The wireless transceiver of claim 8, wherein the control circuit is configured to transmit the aggregated control channel data using one or more physical control channels mapped to the first one of the transmitted carrier signals by time-division multiplexing the encoded first control channel data and the encoded second control channel data using first and second subframes of the first one of the transmitted carrier signals.

* * * * *

UNITED STATES PATENT AND TRADEMARK OFFICE
CERTIFICATE OF CORRECTION

PATENT NO. : 8,451,785 B2
APPLICATION NO. : 12/614526
DATED : May 28, 2013
INVENTOR(S) : Grant et al.

It is certified that error appears in the above-identified patent and that said Letters Patent is hereby corrected as shown below:

In the Specification

In Column 10, Line 40, delete "$s_i =$" and insert -- $s_l =$ --, therefor.

In Column 10, Line 49, delete "$as_i$" and insert -- $as_l$ --, therefor.

Signed and Sealed this
Fifteenth Day of October, 2013

Teresa Stanek Rea
*Deputy Director of the United States Patent and Trademark Office*